United States Patent
Welsh et al.

[11] Patent Number: 6,098,018
[45] Date of Patent: Aug. 1, 2000

[54] METHOD AND APPARATUS FOR AN AUTONOMOUS CLOUD RADAR

[75] Inventors: David C. Welsh, Broomfield; David A. Merritt, Boulder; Anthony J. Francavilla, Broomfield; Thomas Glaess, Westminster; Sandy L. King, Broomfield; Lingling Zhang, Boulder; Kenneth Moran, Longmont, all of Colo.

[73] Assignee: The United States of America as represented by the Department of Commerce, Washington, D.C.

[21] Appl. No.: 09/074,663

[22] Filed: May 8, 1998

Related U.S. Application Data

[60] Provisional application No. 60/068,850, Dec. 29, 1997.

[51] Int. Cl.$^7$ .................................................. G06F 19/00
[52] U.S. Cl. ............................................................ 702/3
[58] Field of Search ............................. 702/3, 4; 342/26, 342/460; 340/601, 602; 395/500.27

[56] References Cited

U.S. PATENT DOCUMENTS

| | | | |
|---|---|---|---|
| 4,521,857 | 6/1985 | Reynolds, III | 702/3 |
| 5,241,315 | 8/1993 | Spinhirne | 342/54 |
| 5,406,481 | 4/1995 | Shinozawa et al. | 364/420 |
| 5,517,193 | 5/1996 | Allison et al. | 342/26 |
| 5,568,151 | 10/1996 | Merritt | 342/192 |
| 5,568,385 | 10/1996 | Shelton | 702/3 |
| 5,583,972 | 12/1996 | Miller | 395/119 |
| 5,652,717 | 7/1997 | Miller et al. | 395/500.27 |
| 5,654,886 | 8/1997 | Zereski, Jr. et al. | 702/3 |
| 5,686,919 | 11/1997 | Jordan et al. | 342/26 |
| 5,689,444 | 11/1997 | Jordan et al. | 364/554 |
| 5,848,378 | 12/1998 | Shelton et al. | 702/3 |
| 5,940,776 | 8/1999 | Baron et al. | 702/4 |

OTHER PUBLICATIONS

Moran, K. P., et al., "Arm's Cloud–Profiling Radar", 28th Conference on Radar Meteorology, American Meteorological Society, Austin, Texas, Sep. 7–12, 1997.

*Primary Examiner*—Donald E. McElheny, Jr.
*Attorney, Agent, or Firm*—Robert P. Bell; John M. Raubitschek

[57] ABSTRACT

A cloud radar apparatus is mounted on a portable containerized unit, a number of which may be located at various positions throughout the planet. Cloud radar data from each unit are periodically measured and stored and made available to researchers, upon request, through the Internet or other network. The system comprises two computers operating on different operating systems. A first computer uses a first operating system which allows it to readily interface with various radar equipment using an IEEE 488 interface or the like, to monitor the health of the equipment and operate the equipment. A second computer system uses a second operating system in a multi-user mode which allows it to readily access and manipulate data files and transfer data over the network. Communication between the two computers is achieved by allowing the first computer to log into the second computer as one of the multiple users. The first computer may upload data to the second computer using a FTP protocol or the like. A second user in the second computer may generate cloud radar images and apply calibration data to received data to produce calibrated data. A third user may be logged onto the second computer to handle data transfers to and from the network. By using two computers with operating systems selected for optimum performance with their respective tasks, the system of the present invention allows for completely autonomous operation of a remote radar site with automated collection and distribution of cloud radar data.

20 Claims, 8 Drawing Sheets

METHOD AND APPARATUS FOR AN AUTONOMOUS CLOUD RADAR

CROSS-REFERENCE TO RELATED APPLICATIONS

This application claims priority from Provisional U.S. Patent Application Ser. No. 60/068850, filed Dec. 29, 1997 and incorporated herein by reference.

STATEMENT OF GOVERNMENT INTEREST

The subject matter of the present application was developed using government funds. The U.S. Government, if not owner of the present invention, has a paid-up license in this invention and the right in limited circumstances to require the patent owner to license others on reasonable terms.

FIELD OF THE INVENTION

The present invention relates to a computer system and network and radar system for autonomously and continuously generating cloud radar data, storing such radar data, and distributing the radar data over a network. The system of the present invention also autonomously controls, calibrates, and monitors the radar system during operation.

BACKGROUND OF THE INVENTION

As part of an effort to study global warming and the effect of greenhouse gases, scientists have undertaken a program of atmospheric radiation measurement (ARM). Part of this study requires measurement of cloud data for a number of locations around the planet. In the prior art, it would be necessary to have a technician or technicians on duty at remote locations to take such data at particular given times, and store such data for further analysis. Such techniques are cumbersome and expensive, as they require a large number of man-hours to operate such equipment at remote locations. Moreover, a scientist or researcher may be interested in cloud data for a particular given time period for which data was not manually taken.

Cloud monitoring may also be of use in airport operations to enhance safety and efficiency in cloudy conditions. Again, however, manpower may not be available to maintain and operate such a radar system and generate cloud radar data upon demand.

SUMMARY OF THE INVENTION

In the present invention, a cloud radar apparatus is mounted on a portable containerized unit, a number of which may be located at various positions throughout the planet.

Cloud radar data from each unit are periodically measured and stored and made available to researchers, upon request, through the Internet or other network. A high water mark program monitors the storage capacity of the system's hard drive and periodically deletes older files. An archive program archives older data files to a digital audio tape (DAT) or the like.

The system comprises two computers operating on different operating systems. Characteristics of each operating system allow each computer to optimally perform its functions. A first computer uses a first operating system which allows it to readily interface with various radar equipment using an IEEE 488 interface or the like, to monitor the health of the equipment and operate the equipment. A second computer system uses a second operating system in a multi-user mode which allows it to readily access and manipulate data files and transfer data over the network.

Communication between the two computers is achieved by allowing the first computer to log into the second computer as one of the multiple users. The first computer may upload data to the second computer using a FTP protocol or the like. A second user in the second computer may generate cloud radar images and apply calibration data to received data to produce calibrated data.

A third user may be logged onto the second computer to handle data transfers to and from the network. By using two computers with operating systems selected for optimum performance with their respective tasks, the system of the present invention allows for completely autonomous operation of a remote radar site with automated collection and distribution of cloud radar data.

DETAILED DESCRIPTION OF THE INVENTION

Figure 1:
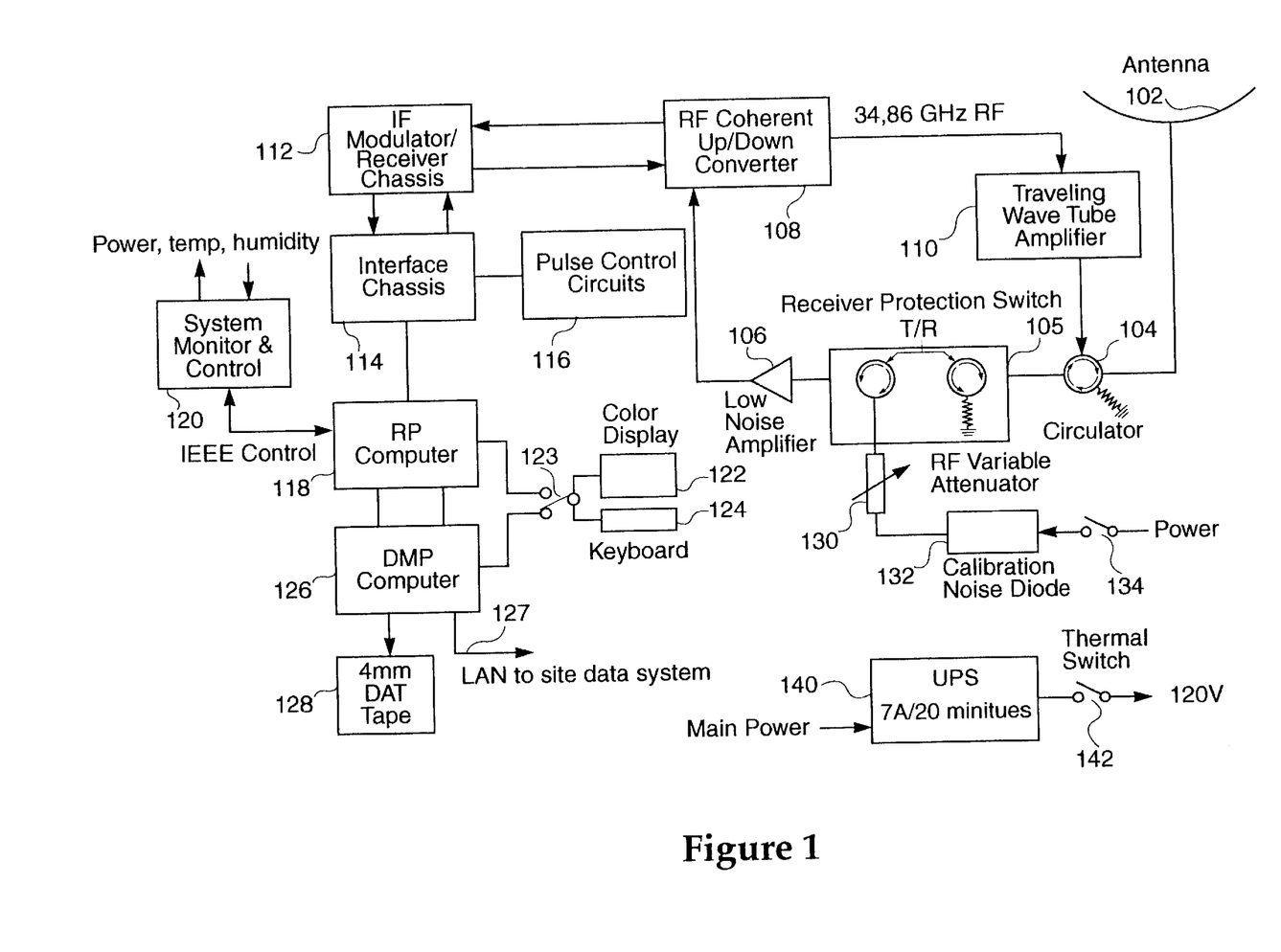
FIG. 1 is a block diagram illustrating the major hardware components of the present invention.

FIG. 1 is a block diagram illustrating the major hardware components of the present invention. The hardware comprises a radar wind profiler (RWP) system comprising commercial off the shelf (COTS) components. High gain antenna 102 may comprise, for example, antenna Model No. 63208300 manufactured by Alpha Industries Inc. of Woburn, Mass. Antenna 102 may be mounted on the roof of a weatherproof climate controlled enclosure similar to a cargo container. Containerizing the hardware allows multiple systems to be rapidly and readily deployed at different points throughout the planet.

Circulator 104 receives signals from and outputs signals to high gain antenna 102. Circulator 104 may comprise, for example, a Model No. WJR-NC circulator manufactured by Microwave Resources Inc. of Chino, Calif. Traveling Wave Tube Amplifier (TWTA) 110 amplifies the output signal for output to high gain antenna 102 through circulator 104. Traveling Wave Tube Amplifier (TWTA) 110 may comprise, for example, a Model No. 187Ka amplifier manufactured by Applied System Engineering of Fort Worth, Tex.

Receiver protection switch 105 protects the receiver portion of the system from input spikes and the like while filtering out spurious noise. Receiver protection switch 105 may comprise, for example, a Model No. 570A-SY T/R switch manufactured by EMS Technologies of Atlanta, Ga. Receiver protection switch 105 may be supplied power through switch 134 through calibration noise diode 132 and RF variable attenuator 130. RF attenuator 130 may comprise, for example, a Model No. FVA-25 RF Attenuator manufactured by Microwave Resources Inc. of Chino, Calif. Calibration Noise Diode 132 may comprise a Model No. NC 53281 34.86 manufactured by Noise Comm, Inc. of Paramus, N.J.

The output of receiver protection switch 105 passes through low noise amplifier (LNA) 106 which may comprise, for example, a Model No. DB94-0880 manufactured by DBS Microwave Inc. of El Dorado Hills, Calif. The output of LNA 106 passes to RF Coherent Up/Down Converter 108 which may comprise, for example, a model R.06-35-.06 converter manufactured by Spacek Labs Inc. of Santa Barbara, Calif. RF coherent up/down converter converts output signals from an intermediate frequency (IF) to a 34.86 GHz RF signal and received signals from high gain antenna 102 back to IF.

IF modulator/receiver chassis 112 may comprise, for example, a model 60001046 receiver/modulator manufactured by Radian International, LLC of Boulder, Colo. IF modulator/receiver 112 modulates an IF signal for output to RF coherent up/down converter 108 and receives an IF return signal from RF coherent up/down converter 108. Interface chassis 114 may comprise, for example, a Model No. 60001047 manufactured by Radian International, LLC of Boulder, Colo. Interface chassis 114 interfaces IF modulator/receiver chassis 112 with pulse control circuits 116 and Radar Processor (RP) 118.

Pulse control circuits 116 may comprise pulse control circuitry known in the art for generating pulses of controllable width and timing. Pulse control circuits 116 generate output pulses which may be converted into a Doppler radar output signal through interface chassis 114, IF modulator/receiver chassis 112, RF coherent up/down converter 108, Traveling Wave Tube Amplifier (TWTA) 110, circulator 104 to antenna 102.

Reflected signals from clouds are received by Antenna 102 and pass back through circulator 104, receiver protection switch 105, LNA 106, RF coherent up/down converter 108, IF modulator/receiver chassis 112, and through interface chassis 114 to Radar Processor (RP) 118. Interface chassis 114 may convert received signals into digital form for analysis by Radar Processor (RP) 118.

Radar Processor (RP) 118 may comprise a Pentium™ based computer running IBM™ OS/2™ was chosen as the operating system for Radar Processor (RP) 118 as it may more readily interface with various instruments and devices of the radar system. In alternative embodiments of the present invention, other operating systems (e.g., Windows™ or the like) may be used in place of the OS/2™ operating system without departing from the spirit and scope of the present invention. The various instruments and devices 110, 108, 112, 114, 116, 105, 120, and 140 may be provided with an IEEE 488 interface (not shown), sometimes referred to as a general purpose interface bus (GPIB), or in a proprietary variant as the Hewlett-Packard™ interface bus (HPIB). Radar Processor (RP) 118 may be provided with an IEEE 488 interface to control the hardware devices, and monitor the radar's internal environment (temperatures, voltages, and switch faults) and external environment (temperature, relative humidity, and external electrical power), and other interfaces to collect radar data.

Radar Processor (RP) 118 comprises control processes to operate radio frequency (RF) hardware, collect analog/digital samples (A/D) of the IEEE 488 devices for health monitoring and remedial action, and transfer files to and retrieve files from Data Management Processor (DMP) 126.

System monitor and control block 120 may monitor temperature and humidity within the cargo container housing the equipment of FIG. 1, as well as power supply conditions. Through an IEEE 488 interface, system monitor and control block 120 may output data to Radar Processor (RP) 118.

Data Management Processor (DMP) 126 may also comprise a Pentium™ based computer running the Solaris™ operating system of Sun Microsystems, Inc. of Palo Alto, Calif. The Solaris™ operating system is a multi-user environment UNIX operating system. In alternative embodiments of the present invention, other operating systems (e.g., UNIX, LINUX, or the like) may be used in place of the Solaris™ operating system without departing from the spirit and scope of the present invention.

Data Management Processor (DMP) 126 handles raw data files from Radar Processor (RP) 118, calibrates the radar data, generates an RP health message, performs local data file backups, generates color-graphic displays, and places data files where a site data system may retrieve them.

Local access to either of Radar Processor (RP) 118 and Data Management Processor (DMP) 126 may be achieved through monitor 122 and keyboard 124 which may be coupled to either of Radar Processor (RP) 118 or Data Management Processor (DMP) 126 via switch 123. Alternately, separate monitors and keyboards may be provided for each of Radar Processor (RP) 118 and Data Management Processor (DMP) 126.

Radar Processor

Radar Processor (RP) 118 comprises the radar processor (RP), responsible for operating, collecting data from, and monitoring the health of, the various instruments and radar apparatus illustrated in FIG. 1.

Figure 2:
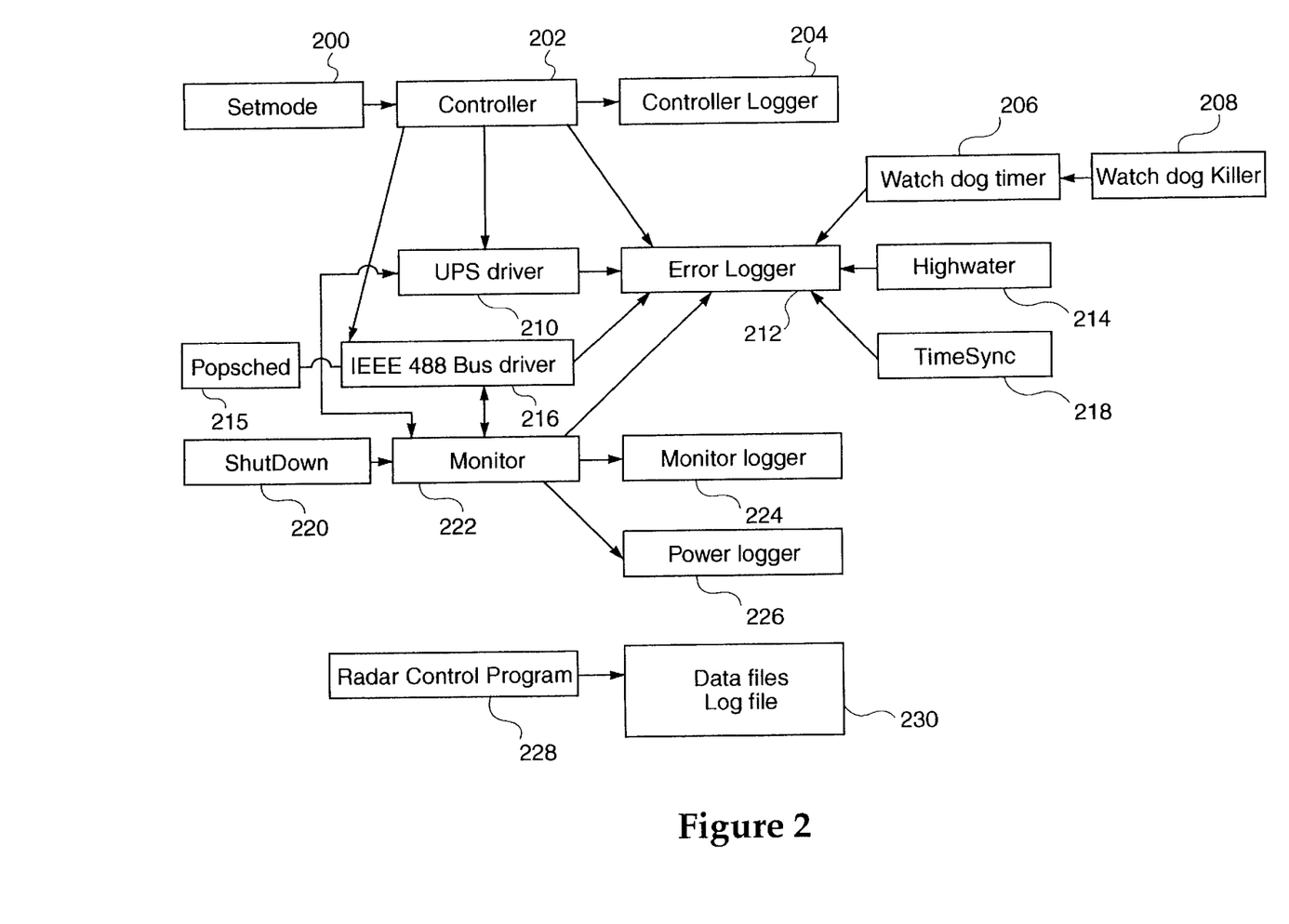
FIG. 2 is a block diagram illustrating the communication paths between different RP processes within Radar Processor (RP) 118.

FIG. 2 is a block diagram illustrating the communication paths between different RP processes within Radar Processor (RP) 118. After Radar Processor (RP) 118 is initialized, the OS/2™ operating system first sets up a file which allows Radar Processor (RP) 118 to log into and transfer files to and from Data Management Processor (DMP) 126. Then, all background processes needed to make Radar Processor (RP) 118 autonomous are started.

First, master error logger process 212 is started. Master error logger process 212 logs messages from all other processes which connect to it. Watchdog timer process 206, a multithreaded process, is used to insure that other processes do not lock up Radar Processor (RP) 118 and interfere with radar operations. IEEE 488 driver 216, a multithreaded processes, controls each device connected to the IEEE 488 bus used by Radar Processor (RP) 118. For example, IEEE 488 driver 216 receives requests from the controller process 202 to set bit(s) on digital input/output (DIO) devices or read A/D channels.

As each request to report A/D channel values is a different thread, each request may be reported asynchronously. Uninterruptable power supply (UPS) 140 protects Radar Processor (RP) 118 and Data Management Processor (DMP) 126 from power fluctuations. UPS driver 210, a multithreaded process, receives instructions from monitor process 222 and reports back requested UPS data.

Two multithreaded processes, monitor logger 224 and power logger 226 are started to record the monitor process data. Controller logger 204, a multithreaded process, records functioning of controller process 202.

Monitor process 222 is started next. Monitor process 222 is multithreaded and requests of IEEE 488 driver 216 and UPS driver 210 that they asynchronously report back information as requested at a specified interval. The data are formatted for output to monitor logger 224 or power logger process 226.

Controller process 202 is started next. Controller process 202 is multithreaded and requests IEEE 488 driver 216 to put devices into their startup state. Next, Traveling Wave Tube Amplifier (TWTA) 110 is brought from its "STANDBY" to its "ON" state.

Time synchronizer process 218 is then started. Time synchronizer process 218 queries the clock of Data Management Processor (DMP) 126 and synchronizes the clock of Radar Processor (RP) 118. Data Management Processor (DMP) 126 has a similar process which queries a time host used as a reference clock. Time synchronizer process 218 maintains the clock of Radar Processor (RP) 118 within one second of the clock of Data Management Processor (DMP) 126.

Finally, a master command, master.cmd, is called to pass the command stream control from the startup folder of Radar Processor (RP) 118 to a user command process. Pseudo code for master command master.cmd may be written as follows:

```
Master.cmd
    Repeat
        Delete old processing semaphore files
        Begin control sequence to collect and transfer
        radar data
        Move files retrieved from data management
        processor to proper directories
    Until popstop file exists
```

As illustrated by the pseudo-code for master.cmd, master command master.cmd runs in an infinite loop. First, old files are deleted using command deflags.cmd. Old files are deleted in case Radar Processor (RP) 118 was not shut down properly. Master command master.cmd then calls control command control.cmd to acquire and transfer the next cycle of cloud radar data.

Next, master command master.cmd moves any new command, batch, or radar parameter files retrieved from Radar Processor (RP) 118 to their proper directories using move command movecmds.cmd. Finally, master command master.cmd loops back to the top and repeats these steps. The infinite cycle of master command master.cmd continues until the "popstop" file is found or Radar Processor (RP) 118 is told to shutdown via shutdown command 220.

Pseudo code for control command control.cmd may be written as follows:

```
Control.cmd
    Set up paths for sequencing and moving data
    Collect radar data
    Sequence and move collected data
    Transfer collected data to Data Management Processor
    Set paths for high water program
    Execute high water program
```

Control command, control.cmd, is the top level command which acquires and moves cloud radar data. First, the cloud radar data and log paths are set (setmover.cmd) for the mover process. Next, the cloud radar data are acquired (do_pop.cmd).

Figure 3:
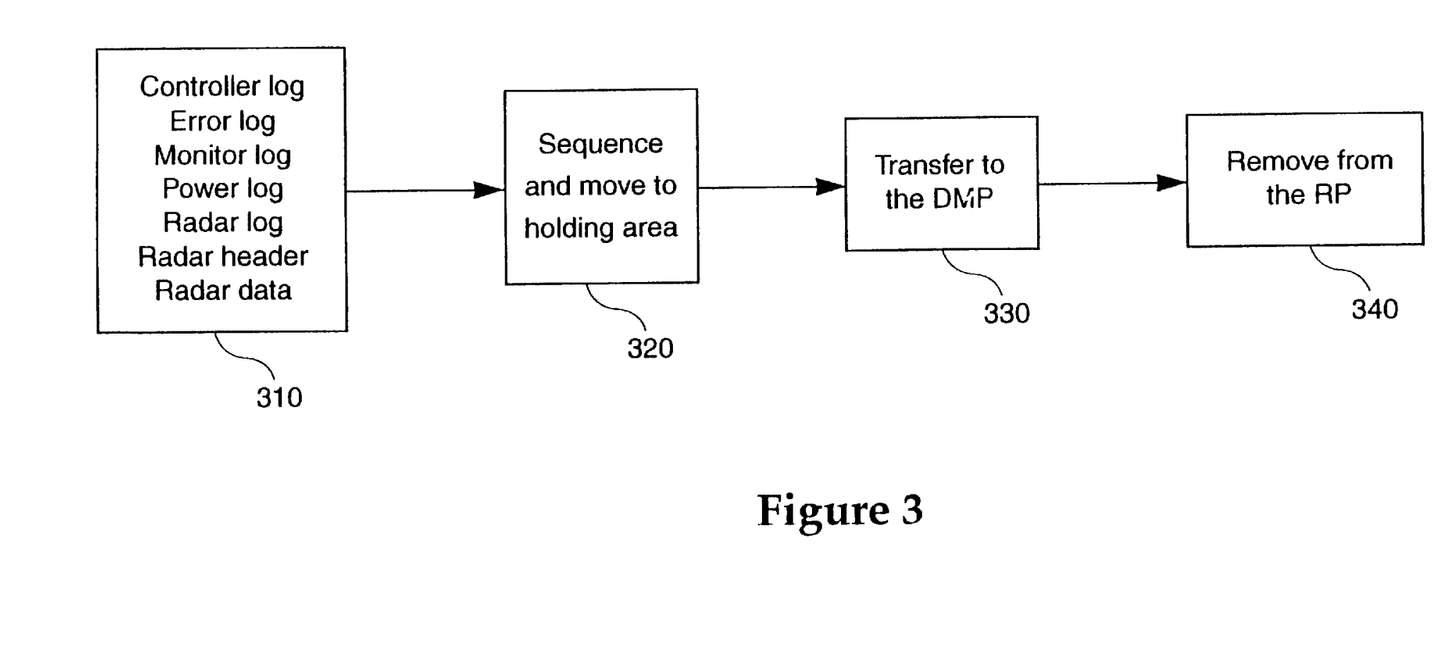
FIG. 3 is a block diagram illustrating the sequence of steps in the file transfer.

FIG. 3 is a block diagram illustrating the sequence of steps in the file transfer. In step 310, controller log data, error log data, monitor log data, radar log data, radar header data and radar data are acquired by Radar Processor (RP) 118. In step 320, Radar Processor (RP) 118 sequences the data and moves the data to a holding area in the hard drive of Radar Processor (RP) 118. In step 330, the data are transferred from Radar Processor (RP) 118 to Data Management Processor (DMP) 126 in a File Transfer Protocol (FTP) command. In step 340, the data from step 310 are removed from Radar Processor (RP) 118.

Acquired cloud radar data and logger files are sequenced and moved by the mover process from their acquisition directories to the transfer directory (holding area). Files in the transfer directory are then transferred to Data Management Processor (DMP) 126 using command do_netio.cmd. New command, batch or radar parameter files are transferred from Data Management Processor (DMP) 126 to Radar Processor (RP) 118 using a reverse path.

Finally, the high watermark program (highwater) 214 is run. If data transfer from Radar Processor (RP) 118 to Data Management Processor (DMP) 126 fails for any reason, there is sufficient storage space within Radar Processor (RP) 118 to hold data and log files. The number of files which may be stored within Radar Processor (RP) 118 depends upon the size and type of the files. For example, fewer spectra data files may be held than moment data files because of their relative sizes. High watermark program 214 allows the file system to grow a certain percentage of total disk capacity. When this capacity is surpassed, the oldest data and log files in the transfer directory are deleted until the file system is within bounds, or there are no further candidate files to delete.

Pseudo code for cloud data radar acquisition command do_pop.cmd may be written as follows:

```
do_pop.cmd
    Put the TWTA into "operate" mode
    Wait until TWTA is in "operate" mode
    Run the radar processor to collect data
```

Radar acquisition command do_pop.cmd is the command file which controls the cloud radar sub-system and collects cloud radar data. Command do_pop.cmd first calls setmode process 200 to request that controller process 202 put Traveling Wave Tube Amplifier (TWTA) 110 into is "operate" mode. Next, a TWTA monitoring program popsched 215 is called which opens a path to IEEE 488 driver 216 and requests the operating status of Traveling Wave Tube Amplifier (TWTA) 110.

Popsched 215 program will exit only when Traveling Wave Tube Amplifier (TWTA) 110 indicates that it has placed itself into "operate" mode. Finally, the profiler online program (POP) is run to collect cloud radar data. The profiler online program (POP) is copyrighted software of Radian International, LLC, of Austin, Tex.

The mover process uses a file (c:\mover.dat) of directory path names and file name extensions set up by the setmover.cmd to move and sequence the log and data files as discussed above in connection with control command control.cmd. For each directory path name, the mover process looks for files of the extension(s) requested. For each unique file type/extension pair, a four digit sequence number is appended to the file name. The sequence is reset to zero each day at 0000 UTC.

This sequencing feature may be required as the POP generates only daily file names. The four digit sequence number allows for 10,000 intervals during each 24 hour period, for a minimum interval size of two minutes. The files are then moved to a transfer directory and are ready to be transferred to Data Management Processor (DMP) 126.

Pseudo code for file transfer command do_netio.cmd may be written as follows:

```
do_netio.cmd
    Log onto DMP and create the os2_lock semaphore file
    While there are files to be transferred
        Transfer data files into DMP
        If the transfer was successful
            Remove the files from the transfer
            directory
        end if
    end While
    Get command files from DMP
    Clean up command files on DMP
    Remove the os2_lock semaphore file on DMP
```

Figure 4:
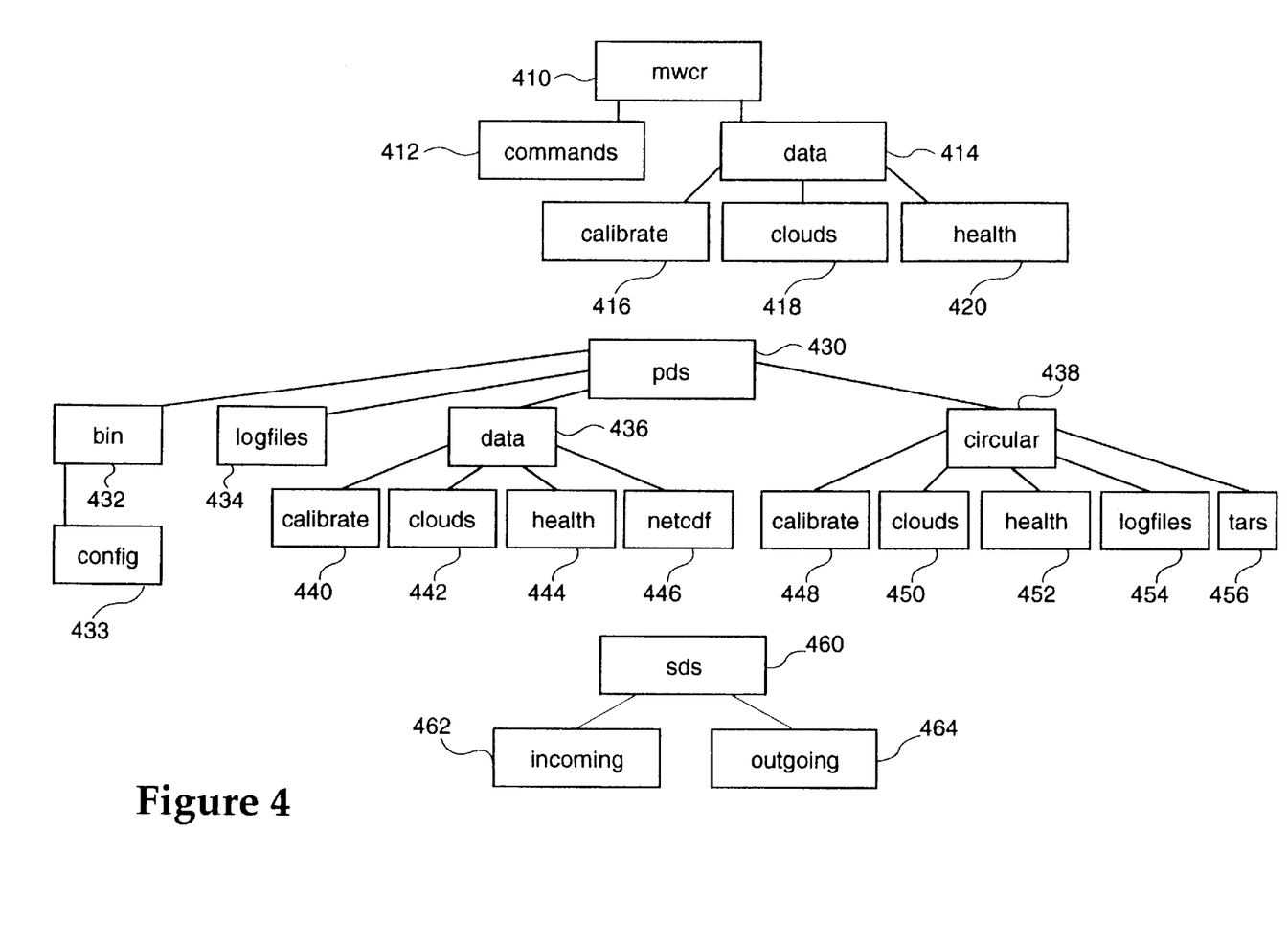
FIG. 4 is a block diagram illustrating the relationship between multi-users on Data Management Processor (DMP) 126 and locations of various data and program files.

Do_netio.cmd is the command file which transfers files to and from Data Management Processor (DMP) 126. First, the command logs into Data Management Processor (DMP) 126 as user mwcr (microwave cloud radar) 410 and executes a script which creates a lock file (os2_lock) in the home directory of user mwcr 410. The lock file tells the processing script (operating as user pds 430) in Data Management Processor (DMP) 126 not to execute because Radar Processor (RP) 118 is transferring files. Radar Processor (RP) 118 transfers files from the transfer directory in batches of ten, using File Transport Protocol (FTP).

After files have been successfully FTP'ed to the Data Management Processor (DMP) 126, they are removed from the transfer directory of Radar Processor (RP) 118. After all of the files are transferred from Radar Processor (RP) 118 to Data Management Processor (DMP) 126, Radar Processor (RP) 118 tries to retrieve new command, batch, or radar parameter files from Data Management Processor (DMP) 126. The, Radar Processor (RP) 118 logs into Data Management Processor (DMP) 126 and removes the command, batch, or radar parameter files that it just transferred. Finally, Radar Processor (RP) 118 logs into Data Management Processor (DMP) 126 as user mwcr 10 and removes the lock file.

Several ancillary programs are used to automate processes within Radar Processor (RP) 118. A watchdog killer program 208 is used to tell the watch dog timer 206 to exit after stopping the timer so that it cannot reset Radar Processor (RP) 118. Shutdown command 220 is used to kill well known OS/2™ processes and performs an OS/2™ shutdown system call (DosShutdown). The shutdown system call flushes the system buffers and the file system goes quiescent. In other words, the file system is safe from corruption when power is removed.

After a shutdown system call, it is safe to turn off power or press CTRL-ALT-DEL to reboot. In order to perform an unattended system reboot, shutdown command 220 accepts the command line argument "-R" for reboot. The "-R" argument causes shutdown command 220 to do all of the above as well as send a message to the watchdog timer to tell it to allow the timer to expire, thus causing a system reset.

An execute with time out program xwto, was developed as a generalized executor process which wraps any command script or program in a timeout structure. In other words, xwto will run a command script or program, at the same time keep track of the time the script or program has been running, kill the process if its allotted run time has expired before completion, and create a flag file so that other command scripts or programs know that the command timed out instead of running to completion. Command xwto is used to wrap all network command scripts so that they cannot, even in the case of a network failure while active, hang the POP radar data collection cycle.

Figure 7:
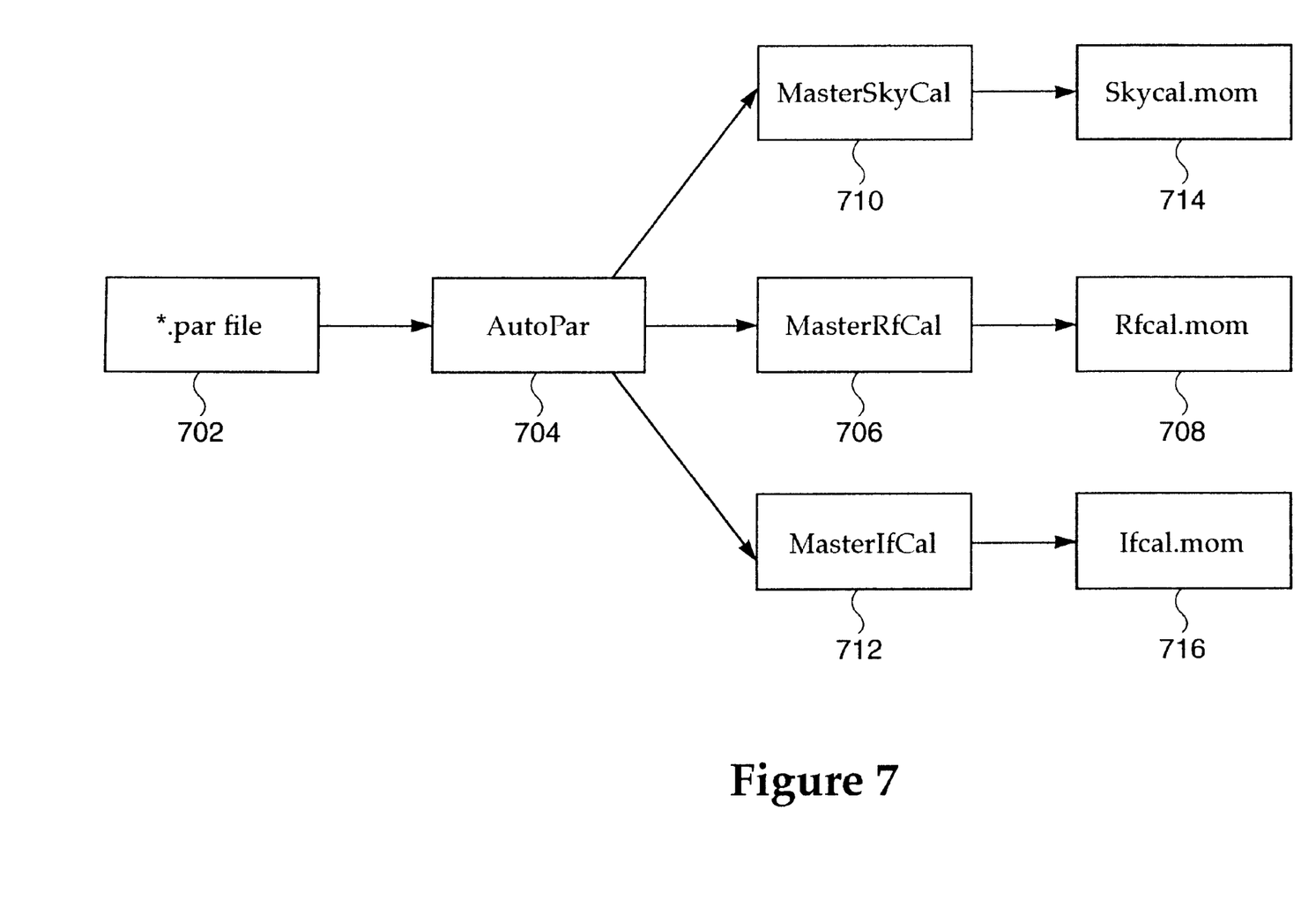
FIG. 7 is a block diagram illustrating the steps performed by Radar Processor (RP) 118 in calibrating the radar system and generating radar calibration files.

In addition to collecting data from the radar system, Radar Processor (RP) 118 may also perform calibration functions on various equipment within the autonomous cloud radar system. FIG. 7 is a block diagram illustrating the steps performed by Radar Processor (RP) 118 in calibrating the radar system and generating radar calibration files. When prompted to perform a calibration, either at a predetermined time interval, or by command, Radar Processor (RP) 118 retrieves par file 702 containing calibration parameters.

Calibration parameters within par file 702 contain instructions as to which settings each piece of equipment within the autonomous cloud radar data system should have during different calibration tasks. In addition, par file 702 may contain data representing acceptable calibration ranges for different equipment. If one or more pieces of equipment generates calibration data which fall outside of a predetermined calibration range, the system may be shutdown and maintenance personnel notified via e-mail.

Shutdowns may be generated from either Data Management Processor (DMP) 126 or from Radar Processor (RP) 118. Radar Processor 118 may transmit a file shutdown.now to Data Management Processor (DMP) 126 indicating that a shutdown is to occur. From an external network, a shutdown.now file may be FTP'ed to Data Management Processor (DMP) 126, then may in turn transfer such a file to Radar Processor (RP) 118.

Radar Processor (RP) 118 may call AutoPar program 704 which may in turn switch calibration noise diode 132 into the radar circuit using T/R protection switch 105. A radar pulse or ping may be transmitted at a given frequency and time duration, and the resulting feedback signal measured. Separate calibration routines may be performed for different portions of the radar apparatus. MasterSkyCal routine 710 may generate calibration data representing "clear sky" background noise (as generated by calibration noise diode 132). Master RfCal routine 706 may be used to generate calibration data for RF components such as RF Coherent Up/Down Converter 108 and Traveling Wave Tube Amplifier (TWTA) 110.

MasterIfCal routine 712 may be used to generate calibration data for intermediate frequency components (e.g., IF Modulator/Receiver Chassis 112). All three calibration routines 710, 706, 712 generate calibration moment files Skycal.mom 714, Rfcal.mom 708, Ifcal.mom 716, respectively. Calibration moment files may then be transferred to Data Management Processor (DMP) 126 using the file transfer techniques discussed above.

Data Management Processor

Data Management Processor (DMP) 126 gathers data transferred from Radar Processor (RP) 118, processes such data, and transfers the data over a Local Area Network (LAN) 127 to a site data system. From the site data system, data may be made available to researchers throughout the world, either over the Internet, or a private or dedicated data network.

Data Management Processor (DMP) 126 performs a number of different functions by operating in a multi-user mode. FIG. 4 is a block diagram illustrating the relationship between multiple users on Data Management Processor (DMP) 126 and locations of various data and program files. Note that in the context of the present invention, the term "user" does not necessarily imply a physical human being, but rather may represent another computer system, network, program or suite of programs autonomously operating as a separate user in a multi-user mode of the computer system.

As discussed above, Radar Processor (RP) 118 may log onto Data Management Processor (DMP) 126 as user mwcr 410. Radar Processor (RP) 118, as user mcwr 410, may retrieve commands from directory 412 in Data Management Processor (DMP) 126 and upload data in the form of calibration data in directory 416, cloud data in directory 418, and system health information in directory 420 in directory tree 414 of user mwcr 410.

When Data Management Processor (DMP) 126 boots, a script file is executed (S98DeleteLockfiles) to remove any lock files which may not have been removed if the system was not properly shutdown. This script file is located in the /etc/rc2.d directory and is executed whenever the Solaris™ operating system goes into multi-user mode. The lock files removed are the ProcessLock and MSD_Lock, in the home directory of user pds 430, and the os2_lock in the home directory of user mwcr 410.

Within Data Management Processor (DMP) 126, the UNIX cron process is used to schedule when user processes are executed. The Korn shell script name and its associated log file may be illustrated as follows:

| | |
|---|---|
| Process.script | Process.YYYYJJJ.log |
| Health.script | Health.YYYYJJJHH.LOG |
| Highwater.script | Highwater.YYYYJJJ.log |
| Archive.script | Archive.YYYYJJJ.log |
| MoveLogFiles.script | MoveLogfiles.YYYYJJJ.log |
| CleanupFiles.script | CleanupFiles.YYYYJJJ.log |
| ShutDown.script | msd.YYYYJJJ.log |
| TimeSynch.script | |

Where YYYY is the four digit year, JJJ is the three digit Julian day of the year, and HH is the two digit hour. All script log file names are in the form NAME.YYYJJJ.log, except for the health message file, which has the form Health.YYYJJJHH.log, where NAME is the name of the script. Each log file is a daily log file except for the Health log file, which is hourly.

The user scripts process the data that Radar Processor (RP) 118 transfers to Data Management Processor (DMP) 126. Root scripts may have to be executed by the super user to shutdown the system or to set the system clock.

Pseudo code for the process Korn shell script may be written as follows:

```
Process.script
    If the Radar Processor is not transferring files
        Set the Process_Lock
        If new calibration data files exist then
            Extract the calibration data from the
            calibration moment files
        end if
        Convert the binary moment and spectra files to
        network Common Data Format (netCDF)
        Convert the Monitor log files to netCDF
        Convert the Forward power log files to netCDF
        Calibrate the radar reflectivity
        Move required files to the Site Data System
        (SDS) outgoing directory
        Move files from the SDS incoming directory
        Move files to the circular directory tree
        Remove the Process_Lock
    end if
```

Process.script is the main processing script and is executed on a schedule which is consistent with the schedule of Radar Processor (RP) 118 sending data to Data Management Processor (DMP) 126. For example, if Radar Processor (RP) 118 is sending data to Data Management Processor (DMP) 126 every thirty minutes on the halfhour, Process.script may be run each half hour at five and thirty-five minutes after the hour. Such a schedule insures that all files are transferred from Radar Processor (RP) 118 before processing of data occurs.

Process.script first writes an entry to the process log file in directory 434 indicating that the script has begun. It then determines whether another Process.script is running by checking for the existence of the ProcessLock file in the home directory of user pds 430. If the ProcessLock file exists, then the script posts a message to the process log file in directory 434 and exits.

If the ProcessLock file does not exist, the script then determines if the Radar Processor (RP) 118 is transferring files to Data Management Processor (DMP) 126 (MwcrUser.script) by checking the Radar Processing (RP) 118 lock file (os2_lock in the home directory of user mwcr 410). If the os2_lock file is found, the script tries to determine if the Radar Processor (RP) 118 user mwcr 410 is logged in (UserLoggedIn.script). The UserLoggedIn.script checks the process status (ps) and looks for user mwcr 410. If user mwcr 410 is found, MwcrUser.script exits with a −1 status, which causes Process.script to exit without processing any files.

If user mwcr 410 is not found, then the script sleeps for ten seconds and tries again. MwcrUser.script may loop for a maximum of six times (i.e., 60 seconds). If, after 60 seconds, user mwcr 410 is determined not to be logged in, it is assumed that Radar Processor (RP) 118 did not clean up the os2_lock file and the MwcrUser.script will remove the os2_lock file and return the status of 0 to Process.script, which will continue processing.

Process.script then creates a ProcessLock file in the home directory of user pds 430 such that only one Process.script executes at a time. Data files in directories 416, 418, and 420 that Radar Processor (RP) 118 has placed in directory tree 414 of user mwcr 410 are moved to corresponding data directories 440, 442, 444 in directory tree 436 of user pds 430 by MwcrMover.script.

Figure 5:
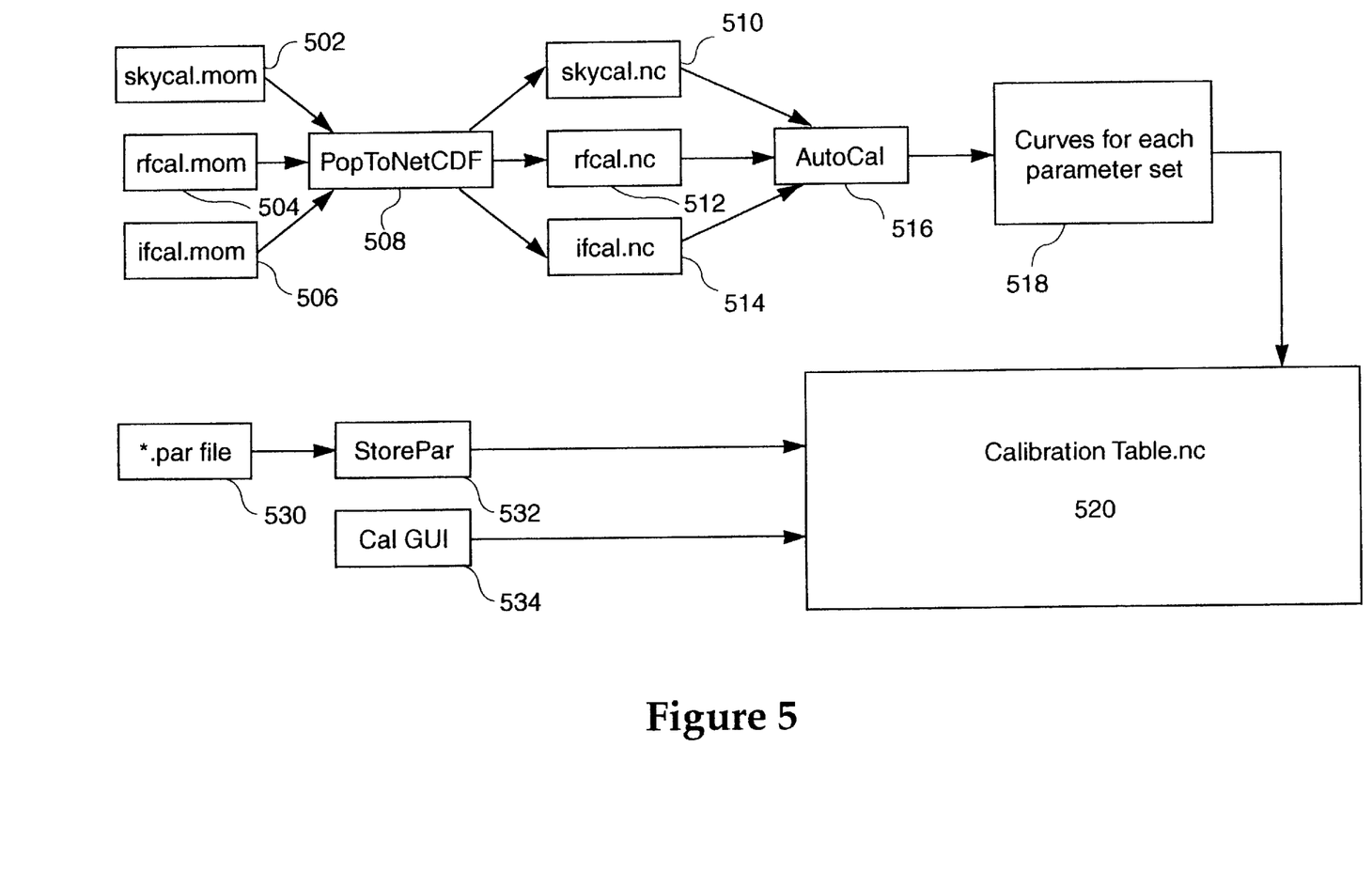
FIG. 5 is a block diagram illustrating the relationship between program s and files in Data Management Processor (DMP) 126 calibration extraction sequence.

FIG. 5 is a block diagram illustrating the relationship between programs and files in Data Management Processor (DMP) 126 calibration extraction sequence. The CalMomExtract.script is executed to determine if there are any calibration moment files 502, 504, and 506, in calibration directory 440. If calibration moment files are present, then calibration data are extracted. Files 510, 512, and 514 in netCDF format are created for the Sky, RF, and IF POP calibration moment data 502, 504, and 506, respectively, using PopToNetCDF routine 508.

To generate a calibration curve, AutoCal program 516 is executed using Sky, RF, and IF netCDF files, 510, 512, and 514, respectively. Calibration curves 518 generated by AutoCal program 516 are written to CalibrationTable.nc file 520 in calibrate files 440 for use in calibrating cloud radar data.

Figure 6:
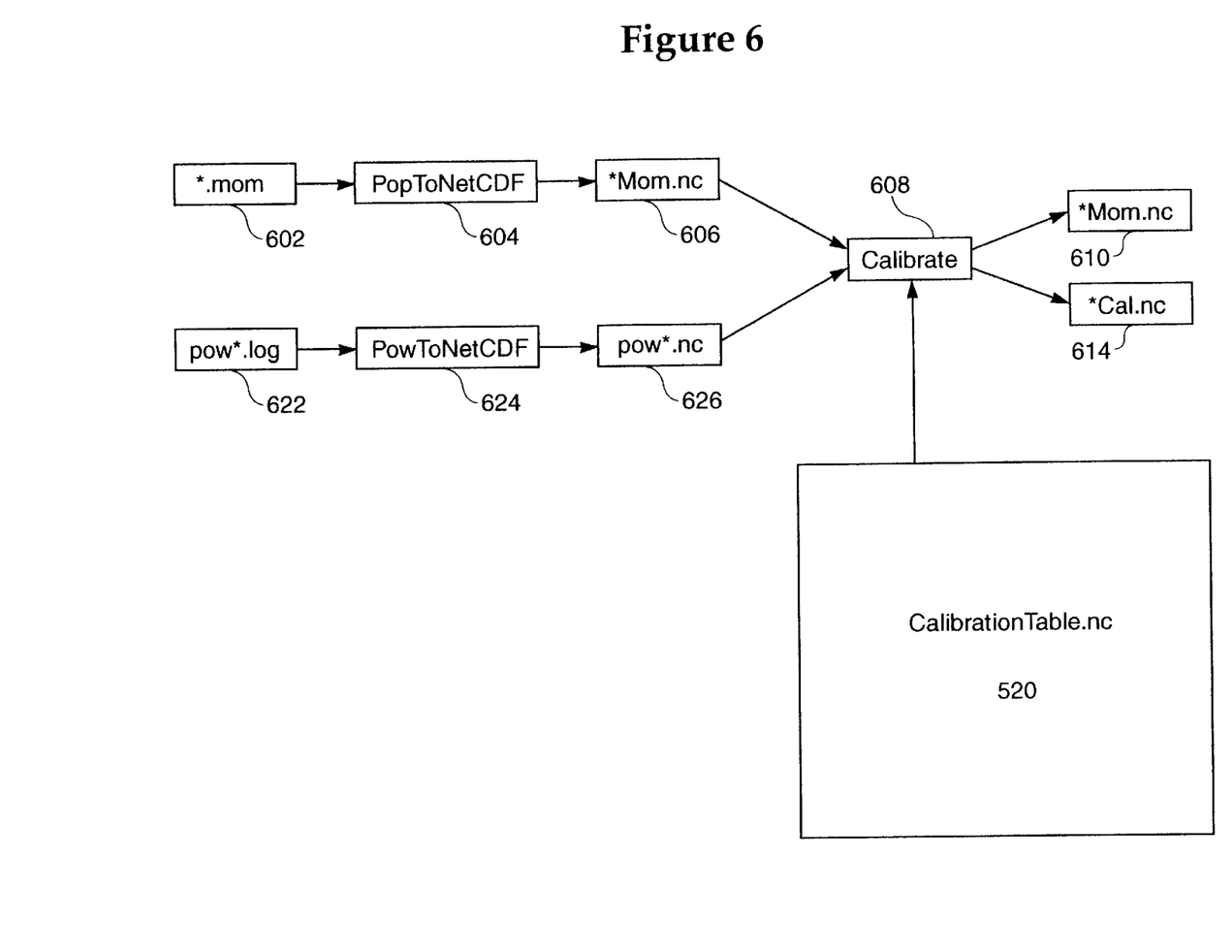
FIG. 6 is a block diagram illustrating the relationship between programs and files in the calibration routine of Data Management Processor (DMP) 126.

FIG. 6 is a block diagram illustrating the relationship between programs and files in the calibration routine of Data Management Processor (DMP) 126. Cloud radar data files 602 are converted from binary POP format to netCDF format files 606 by the program PopToNetCDF 604 called by PopConvert.script and stored in directory 442.

Next, the forward power log files 622 are converted to netCDF by the program PowToNetCDF 624 called by ForwardPowerConvert.script. Then, cloud radar data netCDF files 606 are calibrated using the calibration data in the CalibrationTable.nc file 520 by the program Calibrate 608 called by CalibratePower.script to produce calibrated data 610 and 614. Calibrated data 610 appends to the raw moments file kept on Data Management Processor (DMP) 126. Calibrated data 614 is only the calibrated data and is placed in the outgoing directory 464 of user sds 460.

The next three Korn shell scripts move files which have been processed. First, data files wanted by the Site Data System are moved to the outgoing directory 464 of user sds 460 by MoveToSds.script. Then, any new command, batch, or radar parameter files in the incoming directory 462 of user sds 460 are moved to the commands directory 412 of user mwcr 410 using MoveFromSds.script.

Circular buffer directory 438 stores data for later retrieval by user sds 460 which may output such data, for example, over an internet, intranet, or other type of network. Files in directories 440, 442, and 444 of the data directory tree 436 to be stored in circular directory tree 438 of user pds 430 are moved to directories 448, 450, and 452, respectively, and files that are not needed are deleted by MoveToCircular-.script. Finally, the Process Lock file is removed and an entry is written to the Process log file in directory 434 indicating that the script has finished.

Pseudo code for the health message Korn shell script may be written as follows:

---

Health.script
    Log the network connection to the Radar Processor
    Log the latest moment data file name, size, and creation time
    Run the MonStats program on the monitor files
    Run the MonStats program on the forward power files

---

Health.script generates the CloudRadar health message and writes the health log file in health directory 452. The Health.script is executed each hour. The script first attempts a network "ping" of Radar Processor (RP) 118 and logs the results to the health message log file in directory 452. Next, Health.script logs the latest radar moment netCDF file including the file creation time and size to the health message log file in directory 452.

The MonStats program is then run on the monitor netCDF file(s) of the previous hour and the output logged to the health message log file in directory 452. Finally, health-.script runs the MonStats program on the forward power netCDF file(s) of the previous hour and logs the output to the health message log file in directory 452.

HighWater.script executes the HighWater program and writes to the HighWater logfiles in directory 434. The directory trees monitored are the circular directory 438 of user pds 430 and the outgoing directory 464 of user sds 460. HighWater.script is executed each hour.

The number of files (and therefore how far back in time) which may be held depends upon the size of the files. For example, fewer spectra data files may be held than moment data files because of their relative sizes. The HighWater program allows the file system to grow to a certain percentage of the total disk capacity. When this capacity is surpassed, the oldest data and log files are deleted until the size of the file system is within bounds or there are no further candidate files to delete.

Archive.script executes the archive program and writes to the archive log file in directory 434. Archive.script executes once a day to perform a tar (tape archive) of the data and log files in directories 448, 450, 452, and 454 of the previous day. The output of tar is written to tars directory 456 and compressed. Archive determines if tar file(s) in tars directory 456 can be written onto tape 128 by checking the Archive history log file in directory 433 to calculate how full the tape is.

If Archive determines that there is enough room, then the tar file is written to a 4 mm DAT (Digital Audio Tape) drive 128. If there is not enough room on the DAT, an e-mail message may be sent to the operator of the Site Data System telling him/her to change the tape in tape drive 128. Each tape used by Archive.script is labeled with the tape name when the tape is first loaded.

Archive writes in its history file log in directory 433 the tape name, the file name, the data archived, and the file size. The file name may be in a format site.YYYYJJJ.TTTTTT.tar.Z, where site is a three character site name, YYYY is the four digit year, JJJ is the Julian day of the year, TTTTTT is a six digit tape sequence number, tar is an extension to indicate a tar file, and Z to indicate this is a UNIX compressed file.

Archive may also restore data from tape. A user indicates the date of the tar file to restore, and Archive prompts the user to place the proper tape into the tape drive by using information in the Archive history log in directory 433. Archive checks that the proper tape has been inserted, advances the proper number of files, and extracts the data file.

The MoveLogFiles.script is executed once per day to move all log files of the previous day from the data logfiles directory 434 into the circular buffer logfiles directory 454 of user pds 430. The MoveLogFiles.script writes to the MoveLogFiles log file in directory 434 to record its actions.

The CleanupFiles.script is executed once per day to remove temporary netCDF files used for plotting data from the data netCDF directory 446 of user pds 430, if the user that created such netCDF files is not presently logged into Data Management Processor (DMP) 126. Such superfluous netCDF files may be created if a user logs off Data Management Processor (DMP) 126 before exiting Condor, the Graphical User Interface (GUI) front end program which generates temporary netCDF plot files and creates color graphic displays. CleanupFiles writes to the CleanupFiles log file in directory 434 to record its actions.

The ShutDown.script is executed each minute (the time resolution of the UNIX cron process). It will cleanly shut down the operating system of Data Management Processor (DMP) 126 when a file named shutdown.now is found. ShutDown.script writes messages to the mds (monitor shutdown) log file in directory 434. ShutDown.script is run as the root user as only the root user can shutdown a UNIX operating system. When started, ShutDown.script checks to see if another ShutDown.script is running by checking for the MSD_Lock file in the home directory of user pds 430.

If the lock file exists, then the script logs that fact and exits. If not, then the script goes into an infinite loop checking for the file shutdown.now in the home directory of user mwcr 410 or the incoming directory 462 of user sds 460. The script cycles between the two directories with a five-second delay before the next one is checked.

If the shutdown.now file is found in the mwcr user 410 home directory, Radar Processor (RP) 118 already knows to shut itself down, and Data Management Processor (DMP) 126 can cleanly shut itself down, ready for power to be cycled. If the shutdown.now file is found in the incoming directory 462 of sds user 460 directory, then Data Management Processor (DMP) 126 is being told to shutdown from outside the cloud radar system. Data Management Processor (DMP) 126 will first create a shutdown.now file in the root directory of Radar Processor (RP) 118 and then cleanly shut itself down, ready for power to be cycled.

TimeSynch.script executes the timesynch program to synchronize the internal system clock of Data Management Processor (DMP) 126 with the time of a time host with a resolution of one second. This script is run as the root user so that the system clock can be set. Radar Processor (RP) 118 also runs the timesynch program to synchronize its clock to Data Management Processor (DMP) 126.

Data Management Processor (DMP) 126 may be used as a color-graphics engine to display cloud radar data. Because the Condor program's Graphical User Interface (GUI) is written using the Motif look-and-feel and the color graphics using the X-Window system (e.g., Direct-X or the like), an X-capable system may be used for color-graphics display.

The Condor program has two functions; first, to gather the data that the user wants to display, and second, to create color-graphic displays of the data. To gather data, a user enters the date and time of the beginning and ending period of interest and whether moment or spectral data are desired. Condor performs a system call to makeBigMom or make-BigSpec to gather moment or spectral data, respectively. Either makeBigMom or makeBigSpec can be executed at the system prompt, but each has many command line arguments that Condor hides from the user.

If the data exist on Data Management Processor (DMP) 126, a netCDF file of the requested data are generated. Otherwise, an error message is displayed to the user. The user has the option of saving any netCDF file created by Condor which would be otherwise removed when the Condor program exits normally.

Gathered data may be displayed from within Condor, which performs a system call to the ncbrowser program, or by executing the ncbrowser program from the system prompt. Ncbrowser has its own GUI that allows a user to select a file to be used, the plot type, beginning and ending time, maximum and minimum heights, which variable(s) to plot, the variable(s) minimum and maximum, and, if appropriate, which of the unique radar parameter sets to use. If ncbrowser is called by Condor, the latest netCDF file created is used.

Figure 8:
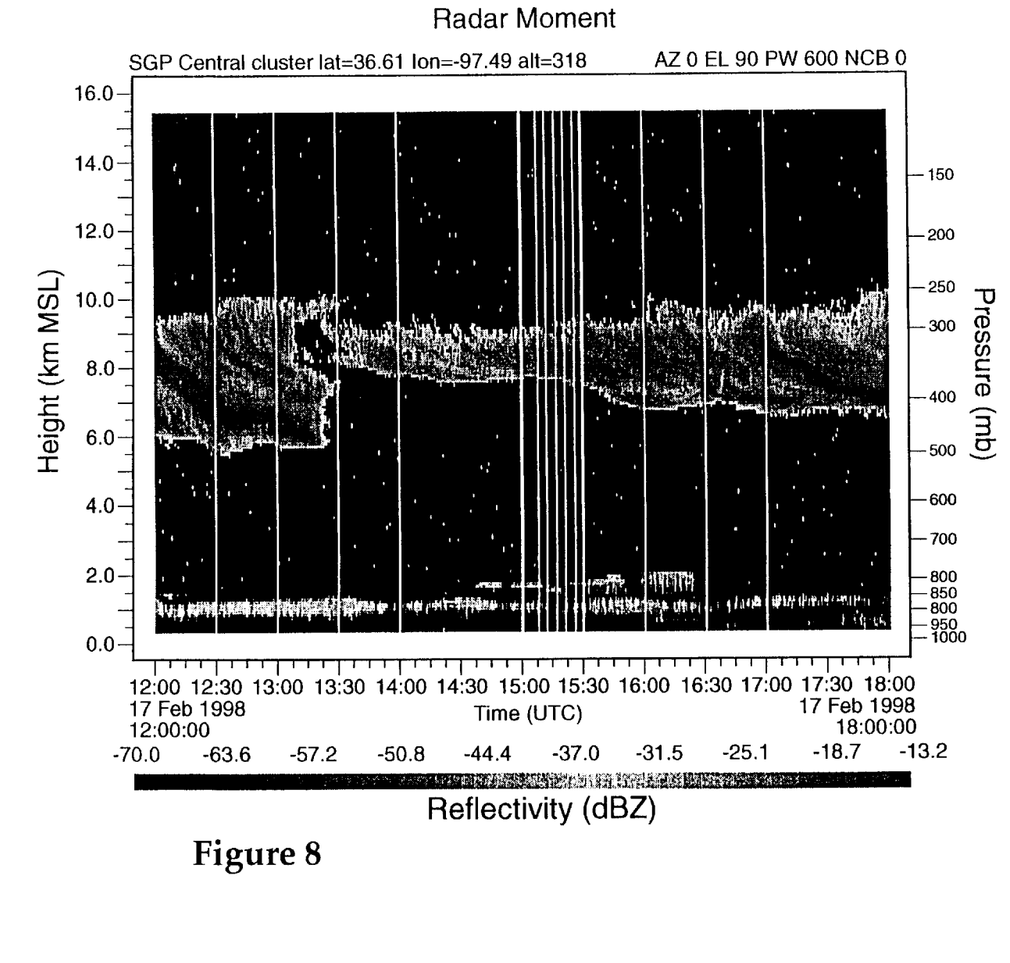
FIG. 8 represents an image for cloud radar data generated at the Department of Energy's Southern Great Plains (SGP) site for Feb. 17, 1998, representing reflectivity for a predetermined sequence of radar pulses.

When all the information is entered, the color graphic is generated and displayed on the screen. Ncbrowser also has the ability to generate color PostScript or GIF output which may be transferred to the user's computer. FIG. 8 represents one such image for cloud radar data generated at the Department of Energy's Southern Great Plains (SGP) site for Feb. 17, 1998, representing reflectivity for a predetermined sequence of radar pulses. Examples of such data may be retrieved from the National Oceanic and Atmospheric Administration web site at http://www4.etl.noaa.gov/cloudrdr.html.

Note that although the image appears cloud-like, the image actually represents reflectivity data for different altitudes within the atmosphere at different times of day. Note also that every half-hour a blank band appears when data are transferred from Radar Processor (RP) 118 to Data Management Processor (DMP) 126. Other bands may appear when data are not available or if Radar Processor (RP) 118 has not completed its tasks from a previous scan. In general, dividing up radar processing tasks and data management processing tasks between the two computers allows for continuous data retrieval at increments of as little as 10 seconds per scan.

While the preferred embodiment and various alternative embodiments of the invention have been disclosed and described in detail herein, it may be apparent to those skilled in the art that various changes in form and detail may be made therein without departing from the spirit and scope thereof.

What is claimed is:

1. An apparatus for autonomously generating atmospheric radar data comprising:
   a portable container for housing the apparatus;
   a radar apparatus, housed on the portable container for generating radar signals and receiving return radar signals reflected from the atmosphere as reflected radar signals;
   a radar processor, housed in the portable container, coupled to the radar apparatus, for controlling and monitoring the radar apparatus and for receiving the reflected radar signals as radar data; and
   a data management processor, housed in the portable containter, coupled to the radar processor, for receiving the radar data, processing the radar data into radar image data, storing the radar image data,
   wherein said data management processor further comprises:
      a multi-user computer system having a plurality of users logged thereto,
         wherein a first user comprises the radar processor logged into the data management processor for transferring radar data from the radar processor to the data management processor as file transfers, and
         wherein a second user comprises a data processing program for processing radar data received as file transfers and outputting processed radar data.

2. The apparatus of claim 1, wherein said data management processor is coupled to at least one data network for distributing the radar image data over the at least one data network.

3. The apparatus of claim 2, wherein said radar processor periodically controls the radar apparatus to cause the radar apparatus to generate radar signals and receive the radar signals reflected from the atmosphere as reflected radar signals, said radar processor receiving the reflected radar signals and storing the reflected radar signals as radar data, said radar processor further comprising:
   means for periodically transferring radar data to said data management processor and for erasing stored radar data from the radar processor after transfer.

4. The apparatus of claim 3, wherein said radar processor further comprises:
   means for controlling the radar apparatus to generate a calibration signal over the radar apparatus;
   means for receiving at least one signal from the radar apparatus representative of the calibration signal passing through at least a portion of the radar apparatus; and
   means for storing the at least one signal as a calibration value.

5. The apparatus of claim 3, wherein said data management processor further comprises:
   a circular buffer for storing radar data received from the radar processor and allowing transfer of stored radar data to the at least one network.

6. An apparatus for autonomously generating atmospheric radar data comprising:
   a portable container for housing the apparatus;
   a radar apparatus, housed on the portable container for generating radar signals and receiving return radar signals reflected from the atmosphere as reflected radar signals;

a radar processor, housed in the portable container, coupled to the radar apparatus, for controlling and monitoring the radar apparatus and for receiving the reflected radar signals as radar data; and a data management processor, housed in the portable containter, coupled to the radar processor, for receiving the radar data, processing the radar data into radar image data, storing the radar image data, wherein said data management processor further comprises:

a multi-user computer system having a plurality of users logged thereto, wherein a first user comprises the radar processor logged into the data management processor for transferring radar data from the radar processor to the data management processor as file transfers, wherein a second user comprises a data processing program for processing radar data received as file transfers and outputting processed radar data, and wherein a third user comprises a site data system, logged into the data management processor, for transferring processed data received from the data management processor to a remote computer system over at least one network.

7. The apparatus of claim 6, wherein said data processing program comprises a program for converting radar data binary moment and spectra files transmitted from the radar processor into network Common Data Format files, and for outputting the network Common Data Format files to the at least one network.

8. The apparatus of claim 7, wherein said radar data processing program first creates a lock file in the data management processor, and said first and third users suspend operation upon detection of the lock file in the data management processor.

9. The apparatus of claim 6, wherein said radar apparatus comprises:

a traveling wave tube amplifier, coupled to receive an input signal from the radar processor, for generating at least one radar pulse; and an antenna, coupled to the traveling wave tube amplifier, for outputting the radar pulse as a radar signal and for receiving a return radar signal reflected from the atmosphere as a reflected radar signal.

10. The apparatus of claim 9, wherein said radar apparatus further comprises:

an intermediate frequency modulator, coupled to the radar processor, for receiving a first pulse control signal from the radar processor and generating an intermediate frequency pulse;

a radio frequency converter, coupled to the intermediate frequency modulator and the antenna, for converting the intermediate frequency pulse to a radio frequency pulse and outputting the radio frequency pulse to the antenna.

11. The apparatus of claim 10, wherein said radar apparatus further comprises:

a transmit-receive switch, coupled to said antenna, for receiving the reflected radar signal from the antenna and passing the reflected radar signal from the antenna to the radio frequency converter, wherein the radio frequency converter converts the reflected radar signal to an intermediate frequency reflected radar signal, the intermediate frequency modulator converts the intermediate frequency reflected radar signal to radar data.

12. A method for autonomously generating atmospheric radar data comprising:

generating, in a radar apparatus, radar signals receiving, in the radar apparatus, return radar signals reflected from the atmosphere as reflected radar signals, controlling, using a radar processor, coupled to the radar apparatus, the radar apparatus, receiving, using the radar processor, the reflected radar signals as radar data, receiving, using a data management processor coupled to the radar processor and to at least one data network, the radar data, processing, using the data management processor, the radar data into radar image data, storing, using the data management processor, the radar image data, and distributing, from the data management processor, the radar image data over the at least one data network, wherein said processing step further comprises the steps of:

logging a first user into the data management processor, the first user comprising the radar processor for transferring radar data from the radar processor to the data management processor as file transfers, and logging a second user into the data management processor, the second user comprising a data processing program for processing radar data received as file transfers and outputting Processed radar data.

13. The method of claim 12, wherein said controlling step further comprises the steps of:

periodically controlling, using the radar processor, the radar apparatus to cause the radar apparatus to generate radar signals, receiving, from the radar apparatus, in the radar processor, radar signals reflected from the atmosphere as reflected radar signals, storing in the radar processor the reflected radar signals, periodically transferring radar data to the data management processor from the fist computer system, and erasing stored radar data from the radar processor after transfer.

14. The method of claim 13, wherein said controlling step further comprises the steps of:

controlling the radar apparatus to generate a calibration signal over the radar apparatus;

receiving at least one signal from the radar apparatus representative of the calibration signal passing through at least a portion of the radar apparatus; and storing the at least one signal as a calibration value.

15. A method for autonomously generating atmospheric radar data comprising:

generating, in a radar apparatus, radar signals receiving, in the radar apparatus, return radar signals reflected from the atmosphere as reflected radar signals, controlling, using a radar processor, coupled to the radar apparatus, the radar apparatus, receiving, using the radar processor, the reflected radar signals as radar data, receiving, using a data management processor coupled to the radar processor and to at least one data network, the radar data, processing, using the data management processor, the radar data into radar image data, storing, using the data management processor, the radar image data, and distributing, from the data management processor, the radar image data over the at least one data network, wherein said processing step further comprises the steps of:

logging a plurality of users into the data management processor, comprising the steps of logging a first user into the data management processor, the first user comprising the radar processor for transferring radar data from the radar processor to the data management processor as file transfers, logging a second user into the data management processor, the second user comprising a data processing program for processing radar data received as file transfers and outputting processed radar data to a circular buffer, and logging a third user into the data management processor, the third user comprising a site data system, for transferring processed data from the circular buffer to a remote computer system over the at least one network.

16. The method of claim 15, wherein said processing step further comprises the steps of:

converting radar data binary moment and spectra files transmitted from the radar processor into network Common Data Format files, and outputting network Common Data Format files to the at least one network.

17. The method of claim 16, wherein said processing step further comprises the steps of:

creating a lock file in the data management processor, said first and third users suspending operation upon detection of the lock file in the data management processor.

18. The method of claim 15, wherein said generating step further comprises the steps of:

generating, in a traveling wave tube amplifier, in response to a received input signal from the radar processor, at least one radar pulse, and outputting, from an antenna coupled to the traveling wave tube amplifier, the radar pulse as a radar signal;

wherein said receiving step further comprises the steps of:
receiving, with the antenna, a return radar signal reflected from the atmosphere as a reflected radar signal.

19. The method of claim 18, wherein said generating step further comprises the steps of:

receiving, in an intermediate frequency modulator coupled to the radar processor, a first pulse control signal from the first computer, generating, from the intermediate frequency modulator, an intermediate frequency pulse, converting, in a radio frequency converter coupled to the intermediate frequency modulator and the antenna, the intermediate frequency pulse to a radio frequency pulse, and outputting the radio frequency pulse to the antenna.

20. The method of claim 18, wherein said receiving step further comprises the steps of:

receiving, in a transmit receive switch coupled to the antenna, the reflected radar signal from the antenna, passing, from the transmit receive switch, the reflected radar signal from the antenna to the radio frequency converter, converting, in the radio frequency converter, the reflected radar signal to an intermediate frequency reflected radar signal, and converting, in the intermediate frequency modulator, the intermediate frequency reflected radar signal to radar data.

* * * * *